Patented Mar. 15, 1938

2,111,043

UNITED STATES PATENT OFFICE 2,111,043

DEHYDROCHLORINATION OF 1,1,1,2 TETRACHLORPROPANE

Oliver W. Cass, Niagara Falls, N. Y., assignor to E. I. du Pont de Nemours & Company, Wilmington, Del., a corporation of Delaware No Drawing. Application May 14, 1935,
Serial No. 21,475

4 Claims. (Cl. 260—165)

This application relates to the preparation of halogenated unsaturated derivatives from saturated compounds. More particularly it relates to the preparation of 1, 1, 2 - trichlorpropene - 1, $CH_3.CCl=CCl_2$ by reacting 1,1,1,2-tetrachlorpropane with a basic compound.

The preparation of 1,1,1,2-tetrachlorpropane is described in my co-pending application, Ser. No. 21,301 filed May 13, 1935. This product, when pure, is a colorless liquid, boiling at about 150° C. In the process which forms the subject matter of this application it is reacted with a basic substance such as caustic soda to prepare the unsaturated chlorinated product 1,1,2-trichlorpropene-1. The latter is a liquid having a boiling point of substantially 118° C.

The reaction is preferably carried out as a liquid phase reaction. An elevated temperature may be maintained such as one which is below the boiling point of 1,1,1,2-tetrachlorpropane. As a practical matter a temperature not in excess of the boiling point of water should be used when the basic material reacted with the chlorpropane is supplied in aqueous solution. Thus, normally it is preferred that a temperature of not over about 100° C. be used, although, if pressure is applied of course, the boiling points may be correspondingly raised. In any event the temperature maintained is conveniently below the boiling point of 1,1,1,2-tetrachlorpropane which boiling point will be about 150° C. at atmospheric pressure and correspondingly higher should increased pressure be applied.

As the most convenient temperature for carrying out the reaction it is preferred to use one of about 95° C. At this temperature the 1,1,2-trichlorpropene-1 formed is steam distilled out of the reaction vessel. It may therefore be said that the preferred reaction temperature is one falling within the temperature range 85-100° C. as in that range the reaction is not as slow as at lower temperatures.

Any basic substance may be used in order to convert the 1,1,1,2-tetrachlorpropane into the unsaturated chlorinated product desired, but I prefer to use strong basic materials such as caustic soda and caustic potash. If alkaline earth metal hydroxides such as calcium hydroxide are used, it will be found ordinarily that the rate of reaction is too slow to be commercially desirable. Similarly, other basic substances such as sodium carbonate will function in the reaction but ordinarily the rate is too slow except when an alkali metal hydroxide is employed.

The base is suitably suspended or dissolved in some medium such as water or alcohol. In practice I have found aqueous and alcoholic solutions most suitable. Of course, when using an alcoholic solution of the base ordinarily a temperature in excess of the boiling point of the alcohol should not be maintained. Here again, however, any temperature up to the boiling point of the 1,1,1,2-tetrachlorpropane may, under most conditions, be used.

The reaction may be carried out in ordinary chemical apparatus such as a vessel connected with a reflux condenser under which operating conditions the product, as distilled off, will condense and run back into the vessel. This is a very practical way of operating and since the rate of reaction is ordinarily not very rapid the advantages of reflux operation are desirable. However, the reaction vessel might be connected to a column and a condenser, in which event the material distilled out of the reaction vessel would be condensed and separately collected in a receiver outside of the reaction vessel.

The reaction occurring may be represented by the following equation:

$$CH_3.CHCl.CCl_3 + NaOH \rightarrow CH_3.CCl=CCl_2 + NaCl + H_2O$$

As will be apparent from a consideration of chemical principles, in the reaction of 1,1,1,2-tetrachlorpropane with a base either one of two possible isomers might result as well as various other by-products. These two isomers are represented by the following formulae:

$$CH_2=CH.CCl_3 \text{ and } CH_3.CCl=CCl_2$$

The fact that the latter compound, 1,1,2-chlorpropene-1 is produced in practically quantitative yields and that the first isomer is practically completely absent from the reaction product is indeed surprising, and could not be predicted from considerations of theoretical organic chemistry.

As an example of the novel improved process for the preparation of 1,1,2-trichlorpropene-1, the following may be given:

Example 728 grams of 1,1,1,2-tetrachlorpropane and an aqueous solution containing 160 grams of caustic soda in 1500 cc. of water were placed in a 3 liter, 3-necked flask equipped with a stirrer and a reflux condenser. The contents of the flask were heated to a temperature of about 95° C. This temperature was maintained for about three hours and the contents of the flask were continually agitated by stirring during this period.

The material in the reaction vessel was then cooled whereupon an oily layer separated. This oily layer was removed, washed with water, dried and fractionated. As a result of the fractionation, 354 grams of 1,1,2-trichlorpropene-1 having a boiling point of 118° C. were obtained. There was also obtained 253 grams of unconverted 1,1,1,2-tetrachlorpropane having a boiling point of about 150° C. It is evident that the yield amounted to about 93% based on the amount of 1,1,1,2-tetrachlorpropane used up in the reaction.

It is to be understood that the various temperatures, amounts of reactants and other conditions described in the preceding example are to be considered as illustrative and not restrictive. The process is one of broad general utility for the preparation of the desired unsaturated chlorinated products by reacting a base with the saturated chlorinated product, and the scope of the invention is therefore to be determined only in accordance with the appended claims. Thus, various changes might be made without departing from the spirit or basic principles underlying the improved process and such changes are to be considered within the purview of the invention.

I claim:

1. A process for preparing 1,1,2-trichlorpropene-1 which comprises reacting 1,1,1,2-tetrachlorpropane in the liquid phase with caustic soda.

2. A process for preparing 1,1,2-trichlorpropene-1 which comprises reacting 1,1,1,2-tetrachlorpropane in the liquid phase with a base selected from the group which consists of alkali metal hydroxides, alkaline earth metal hydroxides and sodium carbonate.

3. A process for preparing 1,1,2-trichlorpropene-1 which comprises reacting 1,1,1,2-tetrachlorpropane in the liquid phase with an alkaline earth metal hydroxide.

4. A process for preparing 1,1,2-trichlorpropene-1 which comprises reacting 1,1,1,2-tetrachlorpropane in the liquid phase with caustic potash.

OLIVER W. CASS.